US012276203B2

(12) United States Patent
Taniguchi et al.

(10) Patent No.: US 12,276,203 B2
(45) Date of Patent: Apr. 15, 2025

(54) STEAM TURBINE EXHAUST CHAMBER AND STEAM TURBINE

(71) Applicant: MITSUBISHI HEAVY INDUSTRIES, LTD., Tokyo (JP)

(72) Inventors: Nao Taniguchi, Tokyo (JP); Ryo Takata, Tokyo (JP); Soichiro Tabata, Yokohama (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 18/012,015

(22) PCT Filed: Aug. 13, 2021

(86) PCT No.: PCT/JP2021/029802
§ 371 (c)(1),
(2) Date: Dec. 21, 2022

(87) PCT Pub. No.: WO2022/039107
PCT Pub. Date: Feb. 24, 2022

(65) Prior Publication Data
US 2023/0258104 A1 Aug. 17, 2023

(30) Foreign Application Priority Data
Aug. 17, 2020 (JP) ................................ 2020-137367

(51) Int. Cl.
*F01D 25/30* (2006.01)
*F01D 25/24* (2006.01)
*F01D 25/32* (2006.01)

(52) U.S. Cl.
CPC ............ *F01D 25/30* (2013.01); *F01D 25/24* (2013.01); *F01D 25/32* (2013.01);
(Continued)

(58) Field of Classification Search
CPC .......... F01D 25/30; F01D 25/24; F01D 25/32; F05D 2220/31; F05D 2240/126; F05D 2260/602
See application file for complete search history.

(56) References Cited

U.S. PATENT DOCUMENTS

| | | | | |
|---|---|---|---|---|
| 6,261,055 | B1 | 7/2001 | Owczarek | |
| 6,419,448 | B1 * | 7/2002 | Owczarek | F01D 25/30 60/692 |

(Continued)

FOREIGN PATENT DOCUMENTS

| | | | |
|---|---|---|---|
| DE | 112018000823 | T5 | 10/2019 |
| DE | 112019006549 | T5 | 9/2021 |

(Continued)

OTHER PUBLICATIONS

International Search Report dated Oct. 19, 2021, issued in counterpart International application No. PCT/JP2021/029802. (13 pages).
(Continued)

*Primary Examiner* — Topaz L. Elliott
*Assistant Examiner* — Andrew J Marien
(74) *Attorney, Agent, or Firm* — WHDA, LLP

(57) ABSTRACT

A steam turbine exhaust chamber for guiding steam after passing through a rotor blade of a final stage of a steam turbine to outside of the steam turbine includes: a casing; a bearing cone; and a flow guide. An inner surface of the casing includes an inner circumferential surface extending along an axial direction of the rotor at a radially outer side of the flow guide and a side wall surface connecting the inner circumferential surface and the bearing cone. A first protruding portion is formed on the side wall surface along the circumferential direction above a horizontal plane including a rotational axis of the rotor. The first protruding portion is positioned at an outer side, in the radial direction of the rotor, of a downstream end of an inner circumferential
(Continued)

surface of the flow guide in at least a partial range in the circumferential direction.

15 Claims, 13 Drawing Sheets

(52) U.S. Cl.
CPC .... *F05D 2220/31* (2013.01); *F05D 2240/126* (2013.01); *F05D 2260/602* (2013.01)

(56) References Cited

U.S. PATENT DOCUMENTS

| | | | | |
|---|---|---|---|---|
| 2013/0224006 | A1* | 8/2013 | Saeki | F01D 3/02<br>415/207 |
| 2019/0353053 | A1 | 11/2019 | Kuwamura et al. | |
| 2020/0011206 | A1* | 1/2020 | Murakami | F01D 25/30 |
| 2021/0262365 | A1* | 8/2021 | Yamashita | F01D 25/24 |
| 2022/0074319 | A1* | 3/2022 | Kuwamura | F01D 25/24 |

FOREIGN PATENT DOCUMENTS

| | | | |
|---|---|---|---|
| EP | 3604747 | A1 | 2/2020 |
| EP | 3604747 | B1 | 5/2023 |
| JP | H109-125908 | A | 5/1997 |
| JP | 2018-131934 | A | 8/2018 |
| JP | 2020-106003 | A | 7/2020 |
| WO | 2018/151158 | A1 | 8/2018 |
| WO | 2018/181855 | A1 | 10/2018 |
| WO | 2020/066891 | A1 | 4/2020 |

OTHER PUBLICATIONS

Notification of Transmittal of Copies of Translation of the International Preliminary Report on Patentability (Form PCT/IB/338) issued in counterpart International application No. PCT/JP2021/029802 mailed Mar. 2, 2023 with Forms PCT/IB/373 and PCT/ISA/237, with translation. (18 pages).

* cited by examiner

STEAM TURBINE EXHAUST CHAMBER AND STEAM TURBINE

TECHNICAL FIELD

The present disclosure relates to a steam turbine exhaust chamber and a steam turbine.

The present application claims priority based on Japanese Patent Application No. 2020-137367 filed on Aug. 17, 2020, with the Japanese Patent Office, the contents of which are incorporated herein by reference.

BACKGROUND ART

In an exhaust flow passage of a steam turbine exhaust chamber, when a steam flow flows backward along a bearing cone in a diffuser flow passage formed between the bearing cone and a flow guide, the effective flow-passage area of the diffuser flow passage (the flow-passage area of steam that flows toward the outlet without flowing back toward the rotor in the diffuser flow passage) decreases and the pressure loss increases, which may lead to performance deterioration of the steam turbine exhaust chamber.

Patent Document 1 discloses providing a structure (guide plate) that protrudes inward in the radial direction from the wall surface of the steam turbine exhaust chamber to suppress a reverse flow of the steam flow along the bearing cone.

CITATION LIST

Patent Literature

Patent Document 1: U.S. Pat. No. 6,419,448B

SUMMARY

Problems to be Solved

As a result of extensive research conducted by the present inventors, it was found that a vertical vortex falling from the upper section of the steam turbine exhaust chamber may cause generation of a reverse flow in the steam flow along the bearing cone inside the diffuser flow passage between the bearing cone and the flow guide. Thus, it is considered critical to suppress intrusion of the vertex vortex into the diffuser flow passage in order to improve the performance of the exhaust chamber.

In the structure for suppressing a reverse flow described in Patent Document 1, it is difficult to suppress intrusion of the vertical vortex into the diffuser flow passage effectively, and thus the effect to suppress an increase in the pressure loss in the diffuser flow passage is limited.

In view of the above, an object of the present disclosure is to provide a steam turbine exhaust chamber and a steam turbine capable of suppressing an increase in the pressure loss in the diffuser flow passage between the bearing cone and the flow guide.

Solution to the Problems

To achieve the above object, according to at least one embodiment of the present disclosure, a steam turbine exhaust chamber for guiding steam after passing through a rotor blade of a final stage of a steam turbine to outside of the steam turbine, includes: a casing; a bearing cone disposed along a circumferential direction of a rotor of the steam turbine inside the casing; and a flow guide disposed along the circumferential direction at a radially outer side of the bearing cone inside the casing, the flow guide forming a diffuser flow passage between the flow guide and the bearing cone. An inner surface of the casing includes an inner circumferential surface extending along an axial direction of the rotor at a radially outer side of the flow guide and a side wall surface connecting the inner circumferential surface and the bearing cone, a first protruding portion is formed on the side wall surface along the circumferential direction above a horizontal plane including a rotational axis of the rotor, the first protruding portion protruding outward in a radial direction of the rotor, and the first protruding portion is positioned at an outer side, in the radial direction, of a downstream end of an inner circumferential surface of the flow guide in at least a partial range in the circumferential direction.

Advantageous Effects

According to the present disclosure, provided is a steam turbine exhaust chamber and a steam turbine capable of suppressing an increase in the pressure loss in the diffuser flow passage between the bearing cone and the flow guide.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as “in a direction”, “along a direction”, “parallel”, “orthogonal”, “centered”, “concentric” and “coaxial” shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as “same” “equal” and “uniform” shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as “comprise”, “include”, “have”, “contain” and “constitute” are not intended to be exclusive of other components.

Figure 1:
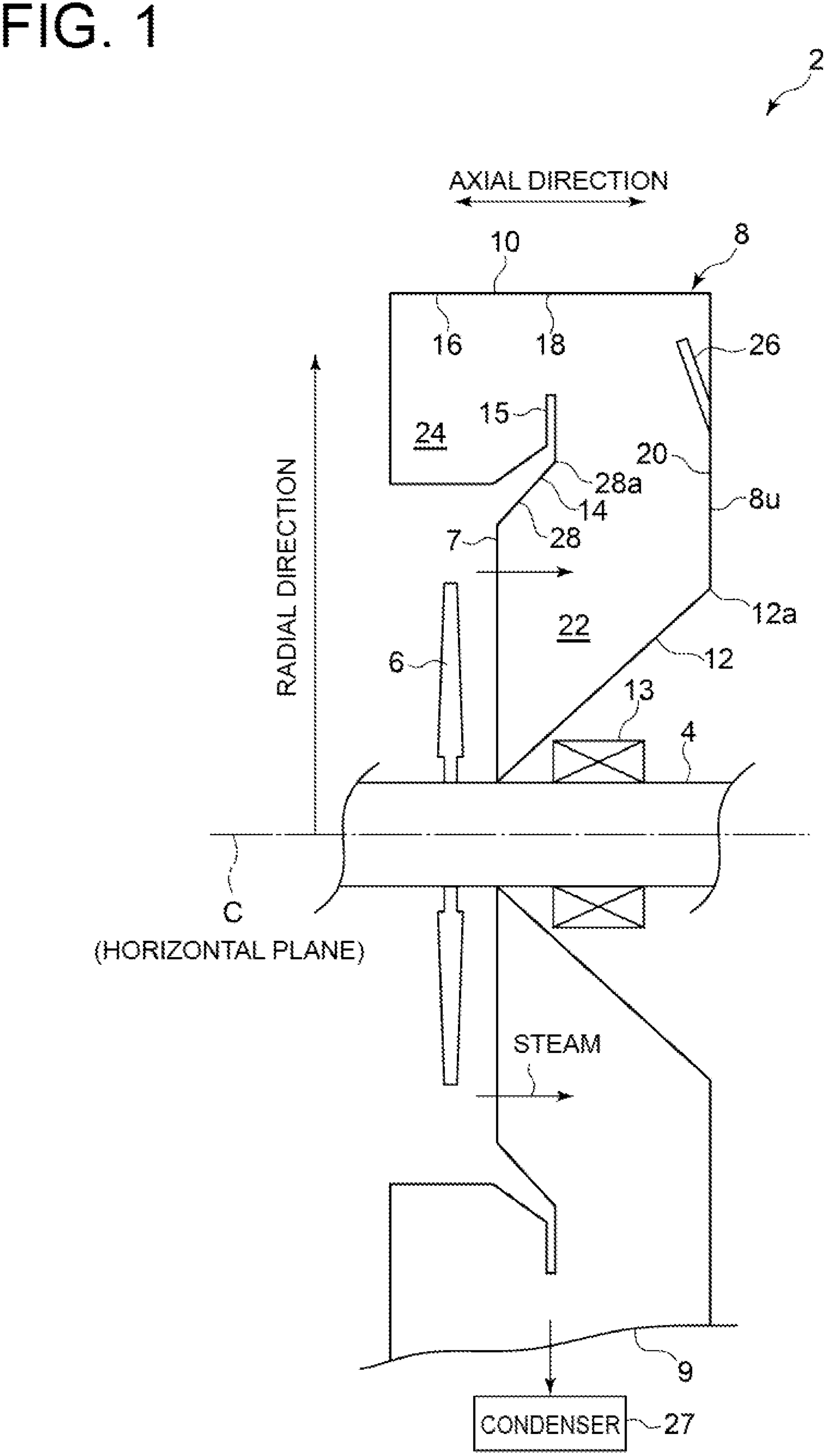
FIG. 1 is a schematic diagram schematically showing a cross section of a steam turbine 2 according to an embodiment, taken along the axial direction.

FIG. 1 is a schematic diagram schematically showing a cross section of a steam turbine 2 according to an embodiment, taken along the axial direction. The depicted steam turbine 2 is an axial-flow turbine. The steam turbine 2 includes a rotor 4 (turbine rotor), and an exhaust chamber 8 (steam turbine exhaust chamber) for guiding steam that has passed through the rotor blade 6 (turbine rotor blade) of the final stage of the rotor 4 to the outside of the steam turbine 2.

The steam after passing the rotor blade 6 of the final stage flows into the exhaust chamber 8 from the exhaust chamber inlet 7, passes through the inside of the exhaust chamber 8, and then is discharged outside the steam turbine 2 from an exhaust chamber outlet 9 disposed at the lower side of the exhaust chamber 8. A condenser 27 is disposed below the exhaust chamber 8, and the steam after having performed work on the rotor blade 6 in the steam turbine 2 flows into the condenser 27 from the exhaust chamber 8 via the exhaust chamber outlet 9.

Hereinafter, the axial direction of the rotor 4 will be referred to as merely “axial direction”, and the radial direction of the rotor 4 will be referred to as merely “radial direction”, and the circumferential direction of the rotor 4 will be referred to as merely “circumferential direction”. Furthermore, the upstream and the downstream of the flow direction of the steam will be referred to as merely “upstream” and “downstream”, respectively.

The exhaust chamber 8 includes a casing 10, a bearing cone 12, and a flow guide 14.

The casing 10 is configured to accommodate a part of the rotor 4, and the inner surface 16 of the casing 10 includes an inner circumferential surface 18, a side wall surface 20, and a protruding portion 26 (structural body).

The inner circumferential surface 18 extends along the axial direction and the circumferential direction at the radially outer side of the flow guide 14 above the horizontal plane including the rotational axis C of the rotor 4 (i.e., in the upper half section **8*u* of the exhaust chamber 8). Furthermore, the inner circumferential surface 18** has a semicircle cross-sectional shape taken in a direction orthogonal to the axial direction, above the horizontal plane including the rotational axis C.

The side wall surface 20 includes a side wall surface 20 extending along the radial direction so as to connect the inner circumferential surface 18 and a downstream end **12*a* of the bearing cone 12. In the illustrated embodiment, the side wall surface 20** is formed along a plane orthogonal to the axial direction.

The bearing cone 12 surrounds a bearing 13 that supports the rotor 4 rotatably. The bearing cone 12 is formed to have an annular shape along the circumferential direction inside the casing 10. Each of the inner diameter and the outer diameter of the bearing cone 12 enlarges toward the downstream side in the axial direction.

The flow guide 14 is formed along the circumferential direction at the radially outer side of the bearing cone 12 inside the casing 10. The flow guide 14 forms a diffuser flow passage 22 having an annular shape between the flow guide 14 and the bearing cone 12. Each of the inner diameter and the outer diameter of the flow guide 14 enlarges toward the downstream side in the axial direction. In the illustrated embodiment, a flow directing plate 15 extending outward in the radial direction from the downstream end **28*a* is connected to the downstream end 28*a* of the flow guide 14 with respect to the steam flow in the axial direction, and the flow directing plate 15** is formed along a plane orthogonal to the axial direction.

Furthermore, inside the exhaust chamber 8, a radially outer space 24 is formed at the opposite side to the diffuser flow passage 22 across the flow guide 14. The radially outer space 24 is positioned at the radially outer side of the flow guide 14.

The diffuser flow passage 22 has a shape whose flow-passage cross-sectional area gradually increases toward the downstream side in the axial direction, and as the steam flow having a high speed passes through the rotor blade 6 of the final stage and then flows into the diffuser flow passage 22, the speed of the steam flow is reduced, and the kinetic energy of the steam is converted into pressure (static pressure recovery).

The protruding portion 26 is disposed so as to protrude outward in the radial direction from the side wall surface 20, above the horizontal plane including the rotational axis C (i.e., in the upper half section **8*u* of the exhaust chamber 8). The protruding portion 26 protrudes outward in the radial direction with distance from the side wall surface 20. The protruding portion 26 is not disposed below the horizontal plane including the rotational axis C. The protruding portion 26 is formed along the circumferential direction, and positioned at the outer side, in the radial direction, of the downstream end 28*a* of the inner circumferential surface 28 of the flow guide 14, in at least a partial range of the circumferential direction. In some embodiments, the protruding portion 26 may be entirely positioned at the outer side, in the radial direction, of the downstream end 28*a* of the inner circumferential surface 28 of the flow guide 14**.

Figure 2:
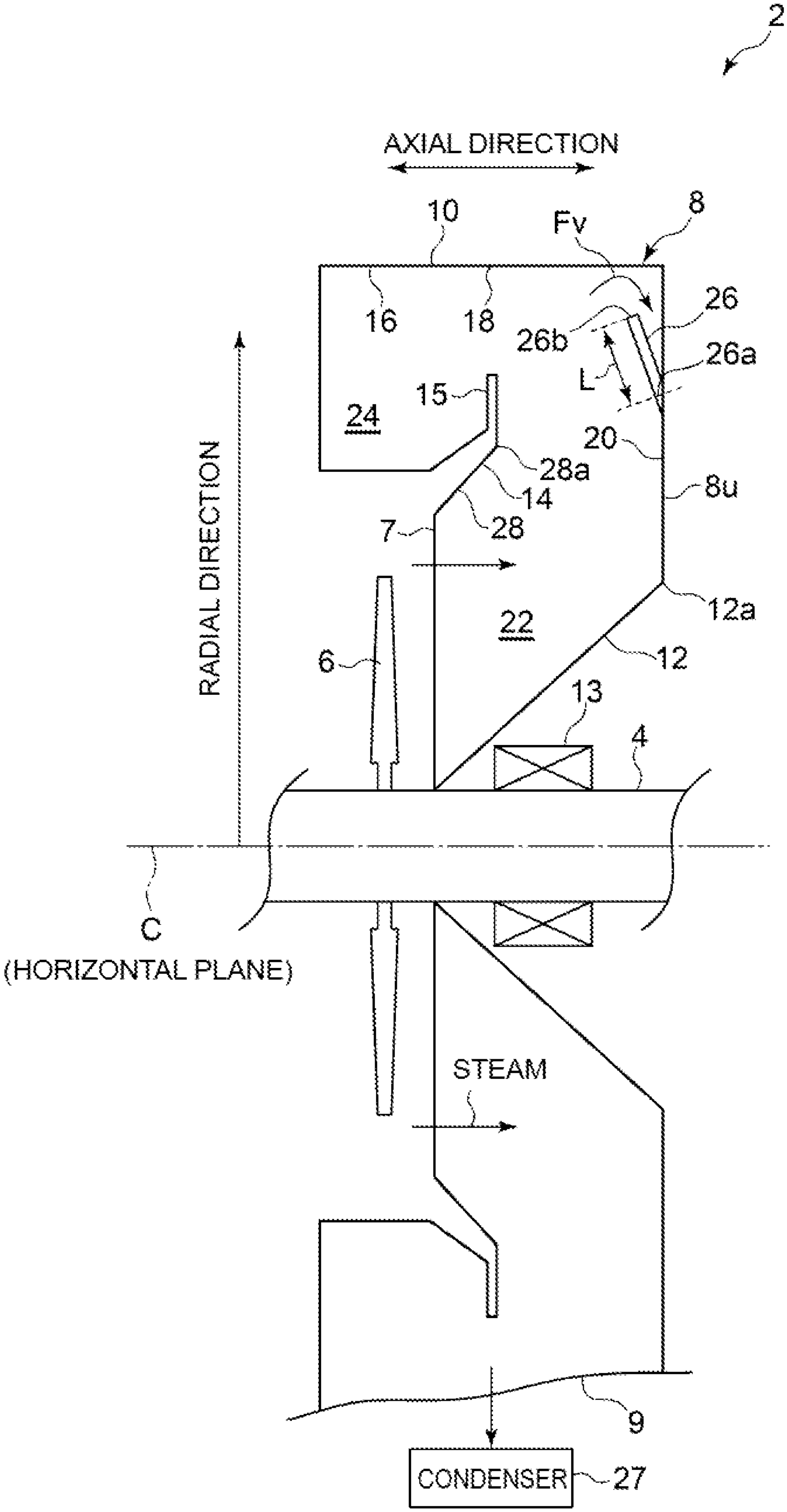
FIG. 2 is a diagram for describing the advantageous effect or the like of a protruding portion 26.

With the above configuration, as depicted in FIG. 2, a vertical vortex Fv falling down from the upper part (vicinity of the inner circumferential surface 18) of the exhaust chamber 8 is received by the protruding portion 26, and thus it is possible to suppress intrusion of the vertical vortex into the diffuser flow passage 22 between the flow guide 14 and the bearing cone 12. Thus, it is possible to suppress deterioration of the performance of the exhaust chamber due to a decrease in the effective flow-passage area of the diffuser flow passage 22 (flow-passage area of the diffuser flow passage 22 where the steam flows outward in the radial direction).

Furthermore, in at least partial range of the circumferential direction, the protruding portion 26 is disposed at the outer side, in the radial direction, of the downstream end 28*a* of the inner circumferential surface 28 of the flow guide 14, and thus it is possible to suppress interference of the protruding portion 26 itself with the steam flow of the diffuser flow passage 22, and it is possible to suppress an increase in the pressure loss inside the diffuser flow passage 22.

Figure 3:
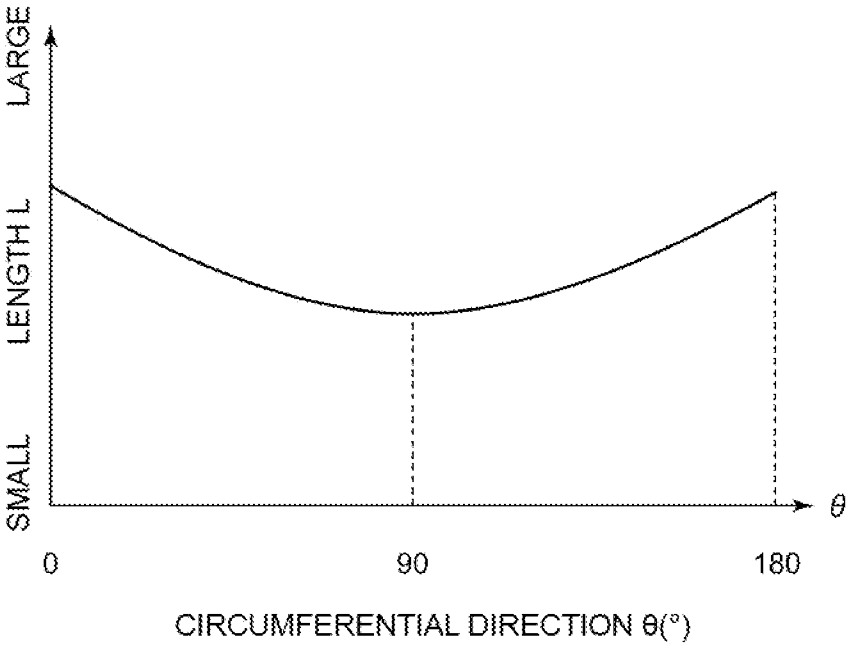
FIG. 3 is a diagram showing an example of the relationship between the position θ in the circumferential direction and the length L of the protruding portion 26 (an example of the circumferential-direction distribution of the length L of the protruding portion 26).
Figure 4:
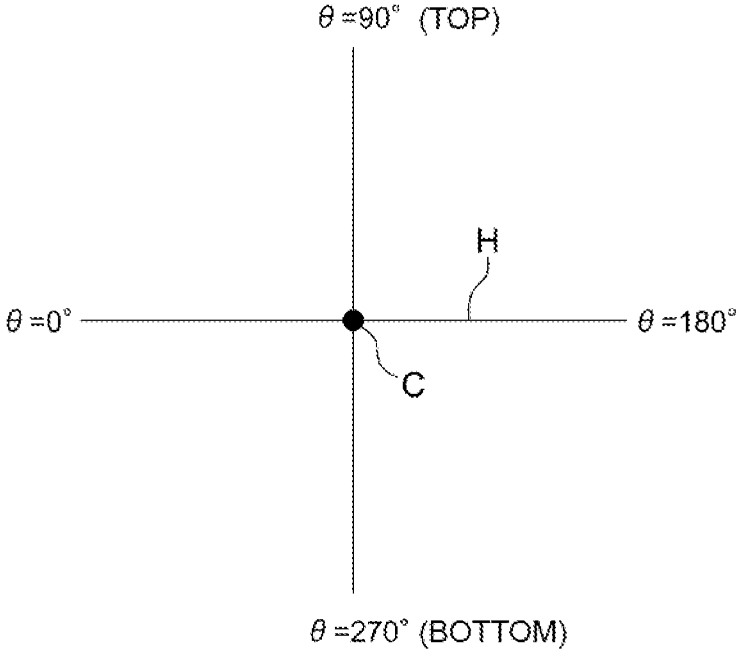
FIG. 4 is a diagram for describing the definition of the position θ in the circumferential direction.

FIG. 3 is a diagram showing an example of the relationship between the position θ in the circumferential direction and the length L of the protruding portion 26 (an example of the circumferential-direction distribution of the length L of the protruding portion 26). The length L of the protruding portion 26 refers to the length between the root end 26*a* and the tip end 26*b* of the protruding portion 26, as depicted in FIG. 2. Furthermore, in the present specification, as depicted in FIG. 4, regarding the position θ in the circumferential direction, the directions indicated by the horizontal line H orthogonal to the rotational axis C are defined as zero degrees and 180 degrees, and the position vertically above the rotational axis C is defined as 90 degrees. Each configuration of the exhaust chamber 8 has a symmetrical shape centered at the vertical plane including the rotational axis C, and any of the two directions indicted by the horizontal line orthogonal to the rotational axis C may be defined as zero degrees.

In some embodiments, as illustrated in FIG. 3 for instance, the length L of the protruding portion 26 may vary depending on the position in the circumferential direction. In the example depicted in FIG. 3, the length L of the protruding portion 26 decreases upward along the circumferential direction, in at least a partial range of the circumferential direction. In the example depicted in FIG. 3, the length L of the protruding portion 26 decreases gradually with distance toward the 90-degree position along the circumferential direction, in the range between zero and 180 degrees in the circumferential direction.

Figure 5:
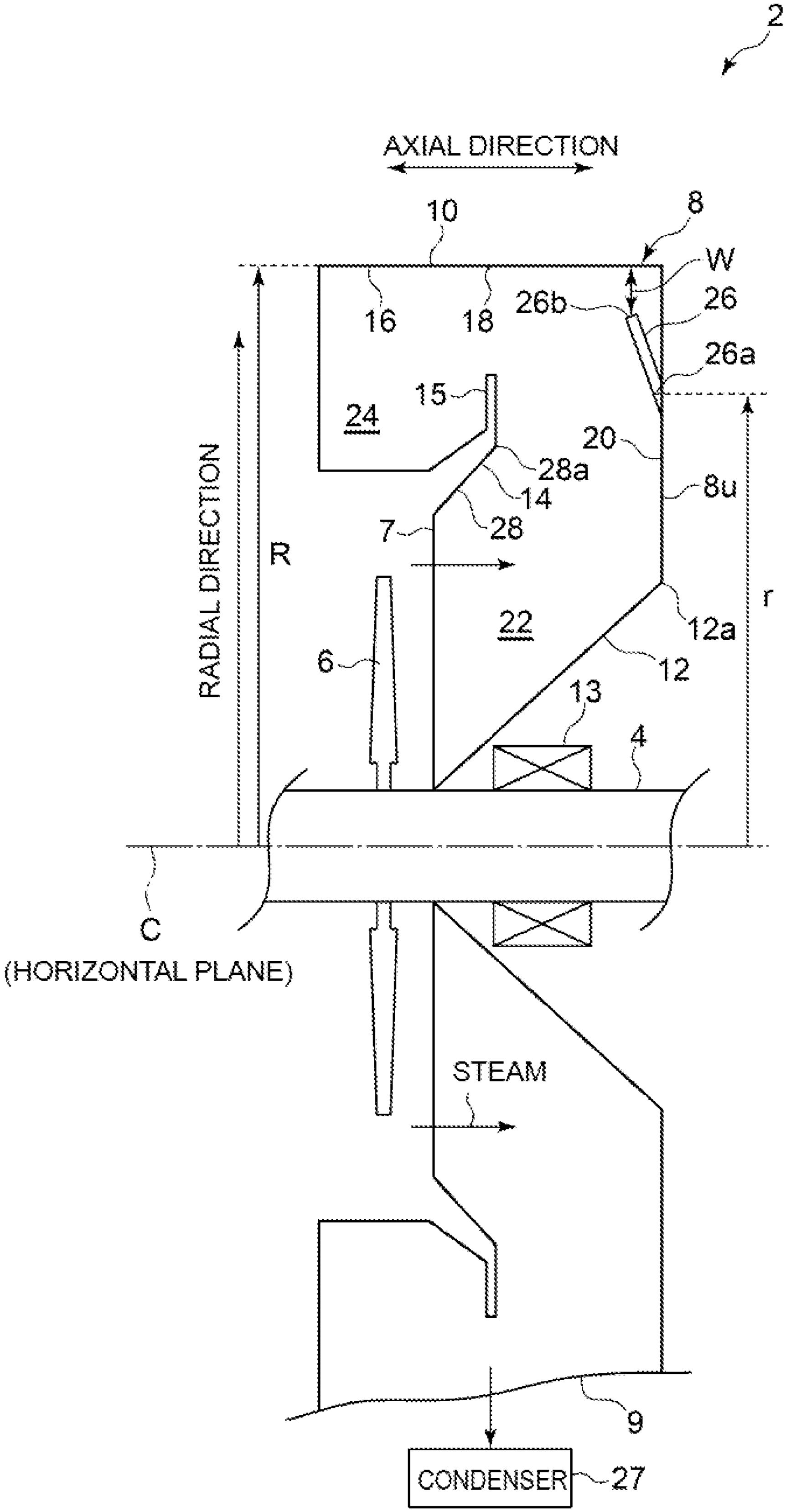
FIG. 5 is a diagram for describing the distance R, the distance 'r' and the flow passage width W.

The inner circumferential surface 18 of the casing 10 has a substantially semi-circle cross-sectional shape in a direction orthogonal to the axial direction, above the horizontal plane including the rotational axis C of the rotor 4. More precisely, the distance R between the inner circumferential surface 18 and the rotational axis C (see FIG. 5) decreases with distance toward the 90-degree position in the circumferential direction. Furthermore, the distance between the inner circumferential surface 18 and the downstream end 28*a* decreases with distance toward the 90-degree position in the circumferential direction. Thus, hypothetically, if the length L of the protruding portion 26 is uniform in the circumferential direction, the flow passage width W (see FIG. 5) between the inner circumferential surface 18 and the tip end 26*b* of the protruding portion 26 becomes smaller compared to other positions in the circumferential direction, in the upper section of the exhaust chamber 8 (vicinity of the 90-degree position in the circumferential direction), and the above effect of providing the protruding portion 26 may become limited.

Thus, with the length L of the protruding portion 26 reduced toward the upper side along the circumferential direction in at least a partial range in the circumferential direction, it is possible to suppress non-uniformity of the flow passage width W between the inner circumferential surface 18 and the tip end 26*b* of the protruding portion 26 in the circumferential direction, and attract the above described vertical vortex toward the gap between the protruding portion 26 and the side wall surface 20 effectively. Thus, it is possible to suppress deterioration of the performance of the exhaust chamber due to a decrease in the effective flow-passage area of the diffuser flow passage 22 effectively.

Figure 6:
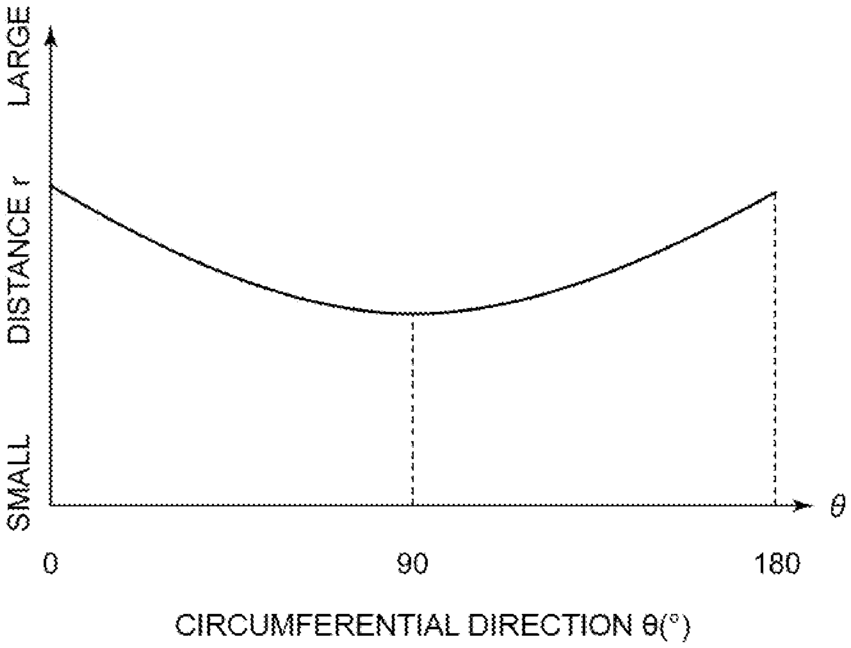
FIG. 6 is a diagram showing an example of the relationship between the position θ in the circumferential direction and the distance 'r' between the root end 26*a* of the protruding portion 26 and the rotational axis C (an example of the circumferential-direction distribution of the distance 'r').

In some embodiments, as illustrated in FIG. 6 for instance, the distance 'r' between the root end 26*a* of the protruding portion 26 and the rotational axis C may vary depending on the position θ in the circumferential direction. In the embodiment depicted in FIG. 6, the distance 'r' between the root end 26*a* of the protruding portion 26 and the rotational axis C decreases toward the upper side along the circumferential direction, in at least a partial range of the circumferential direction. In the embodiment depicted in FIG. 6, the distance 'r' decreases gradually with distance toward the 90-degree position along the circumferential direction, in the range between zero and 180 degrees in the circumferential direction.

Accordingly, it is possible to suppress non-uniformity of the flow passage width W between the inner circumferential surface 18 and the tip end 26*b* of the protruding portion 26 in the circumferential direction, and attract the above described vertical vortex toward the gap between the protruding portion 26 and the side wall surface 20 effectively. Thus, it is possible to suppress deterioration of the performance of the exhaust chamber due to a decrease in the effective flow-passage area of the diffuser flow passage 22 effectively.

Figure 7:
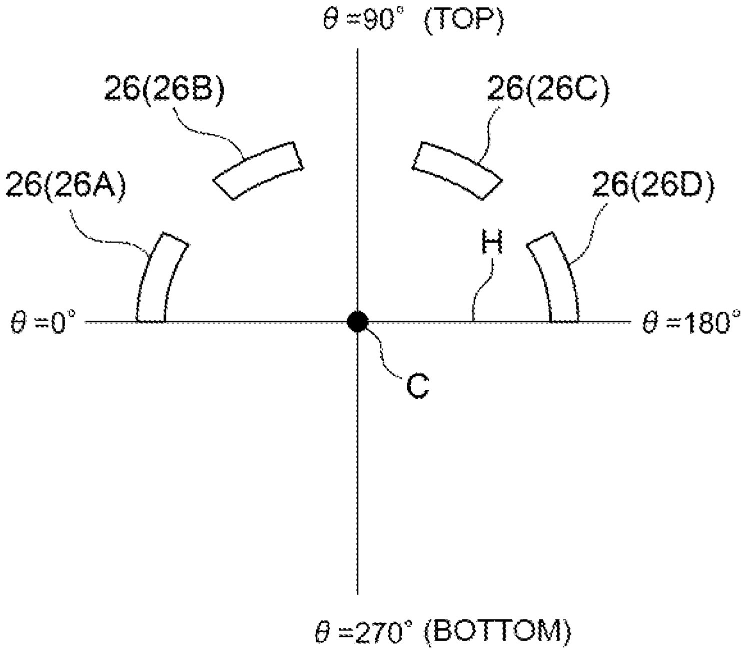
FIG. 7 is a diagram schematically showing an example of the arrangement of the plurality of protruding portions 26 (26A to 26D).

In some embodiments, as depicted in FIG. 7 for instance, a plurality of protruding portions 26 (26A to 26D) may be disposed on the side wall surface 20 of the casing 10.

In the example depicted in FIG. 7, the plurality of protruding portions 26 (26A to 26D) are disposed on the side wall surface 20 above the horizontal plane including the rotational axis C of the rotor 4 (the horizontal plane including the zero-degree position and the 180-degree position). The plurality of protruding portions 26 (26A to 26D) include four protruding portions 26A to 26D arranged at intervals in the circumferential direction. The plurality of protruding portions 26 (26A to 26D) are disposed in a partial range (subrange) where the vertical vortex is dominant, of the range between zero and 180 degrees in the circumferential direction. Of the plurality of protruding portions 26 (26A to 26D), the protruding portions 26B, 26C are disposed at positions higher than the protruding portions 26A, 26D. The protruding portion 26B is disposed between the protruding portion 26A and the 90-degree position, and the protruding portion 26C is disposed between the protruding portion 26D and the 90-degree position.

Each of the plurality of protruding portions 26 (26A to 26D) is formed along the circumferential direction, and protrudes outward in the radial direction, as depicted in FIG. 1. Each of the plurality of protruding portions 26 (26A to 26D) protrudes outward in the radial direction with distance from the side wall surface 20. Furthermore, as depicted in FIG. 1, each of the protruding portions 26 (26A to 26D) is positioned at the outer side, in the radial direction, of the downstream end 28*a* of the inner circumferential surface 28 of the flow guide 14, in at least a partial range of the circumferential direction. In some embodiments, the plurality of protruding portions 26 (26A to 26D) may be entirely positioned at the outer side, in the radial direction, of the downstream end 28*a* of the inner circumferential surface 28 of the flow guide 14.

As illustrated in FIG. 7, by providing the protruding portions 26 (26A to 26D) only in a partial range where the vertical vortex is dominant, of the range between zero and 180 degrees, it is possible to suppress intrusion of the vertical vortex into the diffuser flow passage 22 and improve the performance of the exhaust chamber, while suppressing an increase in the pressure loss applied by the protruding portions 26, compared to a case where the protruding portions 26 are provided over the entire range between zero and 180 degrees. Furthermore, since the protruding portion 26 is divided into a plurality of protruding portions 26 (26A to 26D), it is possible to fix each protruding portion 26 to the side wall surface 20 easily by welding or the like, compared to a case where the protruding portion 26 is provided over the entire range between zero and 180 degrees.

In the example depicted in FIG. 7, at least a part of the plurality of protruding portions 26 (26A to 26D) are disposed within the range between 30 and 150 degrees in the circumferential direction. Furthermore, of the four protruding portions 26 (26A to 26D), two protruding portion 26 (26B, 26C) are disposed within the range between 30 and 150 degrees. Accordingly, by providing at least a part of the protruding portions 26 within the range between 30 and 150 degrees, it is possible to suppress intrusion of the vertical vortex into the diffuser flow passage 22 and improve the exhaust chamber performance.

In some embodiments, the length L between the root end 26*a* and the tip end 26*b* (see FIG. 2) may be different among the plurality of protruding portions 26 (26A to 26D) depicted in FIG. 7. For instance, the length L of the protruding portions 26B, 26C positioned at a higher position than the protruding portions 26A, 26D may be greater than the length of the protruding portions 26A, 26D.

The influence of the vertical vortex is larger in the upper part of the exhaust chamber 8 (near the above described 90-degree position) than at the horizontal position (near the above described zero-degree and 180-degree position). Thus, with the length L of the protruding portions 26B, 26C positioned at a relatively high position being greater than the length L of the protruding portions 26A, 26D positioned at a relatively low position, it is possible to suppress intrusion of the vertical vortex into the diffuser flow passage 22 effectively and improve the exhaust chamber performance.

Figure 8:
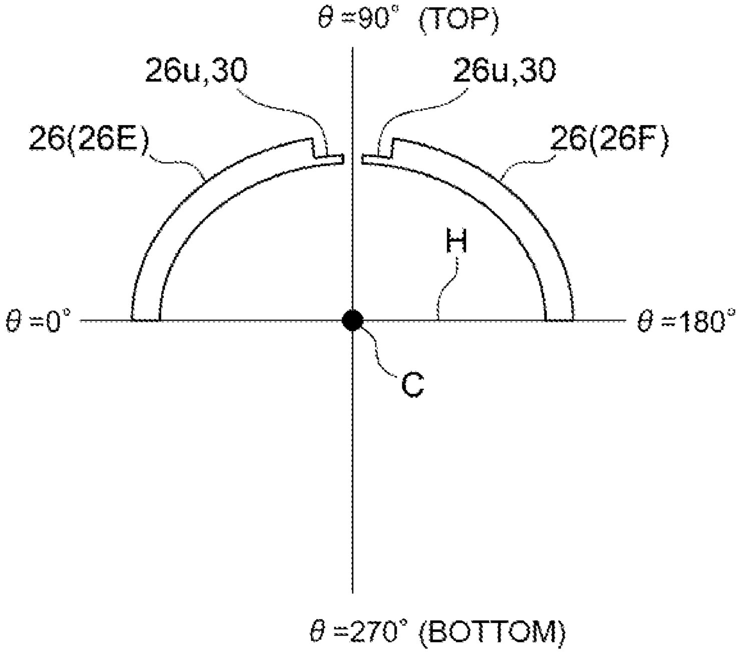
FIG. 8 is a diagram schematically showing an example of the arrangement of the plurality of protruding portions 26 (26E and 26F).

In some embodiments, as depicted in FIG. 8 for instance, a plurality of protruding portions 26 (26E, 26F) may be disposed on the side wall surface 20 of the casing 10.

In the example depicted in FIG. 8, the plurality of protruding portions 26 (26E, 26F) are disposed on the side wall surface 20 above the horizontal plane including the rotational axis C of the rotor 4 (the horizontal plane including the zero-degree position and the 180-degree position). The plurality of protruding portions 26 (26E, 26F) include two protruding portions 26E, 26F arranged at intervals in the circumferential direction. In the illustrated embodiment, the plurality of protruding portions 26 (26E, 26F) include a protruding portion 26E, and a protruding portion 26F disposed opposite to the protruding portion 26E across the vertical plane including the rotational axis C. The protruding portion E is formed over the range between zero degrees and substantially 90 degrees in the circumferential direction, and the protruding portion 26F is formed over the range between substantially 90 degrees and 180 degrees.

Each of the plurality of protruding portions 26 (26E, 26F) is formed along the circumferential direction, and protrudes outward in the radial direction, as depicted in FIG. 1. Each of the plurality of protruding portions 26 (26E, 26F) protrudes outward in the radial direction with distance from the side wall surface 20. Furthermore, as illustrated in FIG. 1, each of the protruding portions 26 (26E, 26F) is positioned at a position at the outer side, in the radial direction, of the downstream end 28*a* of the inner circumferential surface 28 of the flow guide 14, in at least a partial range of the circumferential direction. In some embodiments, the plurality of protruding portions 26 (26E, 26F) may be entirely positioned at a position at the outer side, in the radial direction, of the downstream end 28*a* of the inner circumferential surface 28 of the flow guide 14.

In the example depicted in FIG. 8, a recess portion 30 recessed inward in the radial direction is formed on the upper end 26*f* of each of the protruding portions 26 (26E, 26F). The recess portion 30 of each of the protruding portions 26 (26E, 26F) is formed on an end portion, in the circumferential direction, of each of the protruding portions 26 (26E, 26F), and the recess portion 30 of the protruding portion 26E and the recess portion 30 of the protruding portion 26F are formed at positions facing each other.

At the upper end 26*u* of each of the protruding portions 26 (26E, 26F), the flow passage width W (see FIG. 5) between the inner circumferential surface 18 and the tip end 26*b* of the protruding portion 26 tends to become narrow. Thus, by providing the recess portion 30 as described above, it is possible to ensure the flow passage width W and induce the vertical vortex to the gap between the protruding portion 26 and the side wall surface 20. Accordingly, it is possible to suppress intrusion of the vertical vortex into the diffuser flow passage 22 and improve the exhaust chamber performance. Furthermore, since the protruding portion 26 is divided into the plurality of protruding portions 26 (26E, 26F), it is possible to fix each protruding portion 26 to the side wall surface 20 easily by welding.

Figure 9:
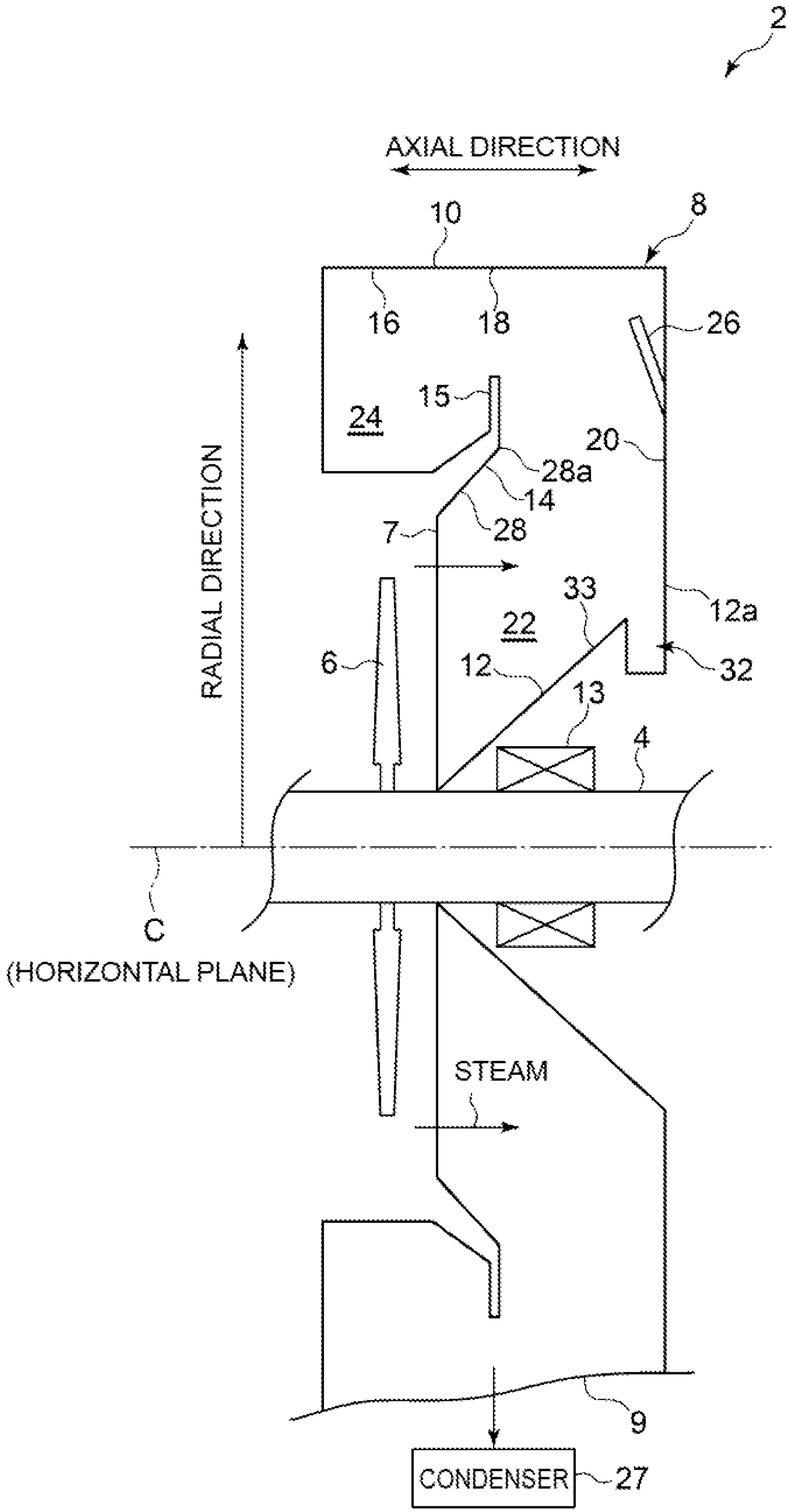
FIG. 9 is a schematic diagram showing a cross section of an exhaust chamber 8 of a steam turbine 2 according to another embodiment, taken along the axial direction.

In some embodiments, as depicted in FIG. 9 for instance, a cavity 32 recessed inward in the radial direction may be formed on the outer circumferential surface 33 of the bearing cone 12. In the embodiment depicted in FIG. 9, the cavity 32 is formed over the entire range in the circumferential direction at the position of the downstream end 12*a* of the bearing cone 12, so as to have an annular shape. Nevertheless, in another embodiment, the cavity 32 may be disposed only in a partial range in the circumferential direction, and may be disposed only above the horizontal plane including the rotational axis C (the upper half of the bearing cone 12), for instance.

Figure 10:
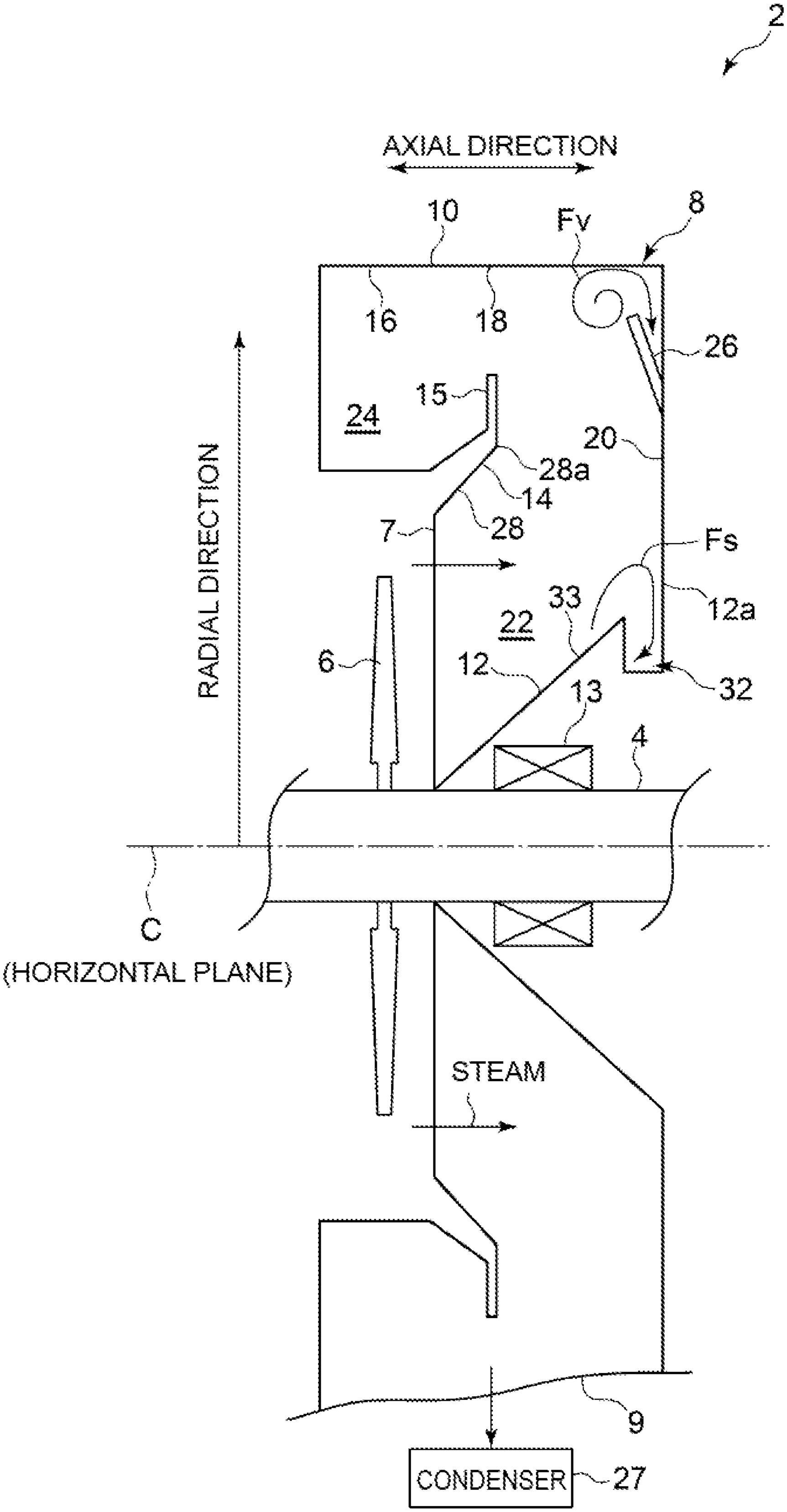
FIG. 10 is a diagram for describing the advantageous effect of the configuration depicted in FIG. 9.

With the configuration depicted in FIG. 9, a part of the steam flow Fs after colliding with the side wall surface 20 is guided to the cavity 32 as depicted in FIG. 10, and thus it is possible to suppress a reverse flow of the steam flow along the bearing cone 12 and suppress flux which may cause two-dimensional separation at the time of low-mach operation, and thereby improve the low-mach side performance. Furthermore, it is also possible to suppress three-dimensional separation at the time of high-mach operation by receiving the vertical vortex Fv with the protruding portion 26, and thus it is possible to realize a high robustness regarding the performance against the operating conditions.

Figure 11:
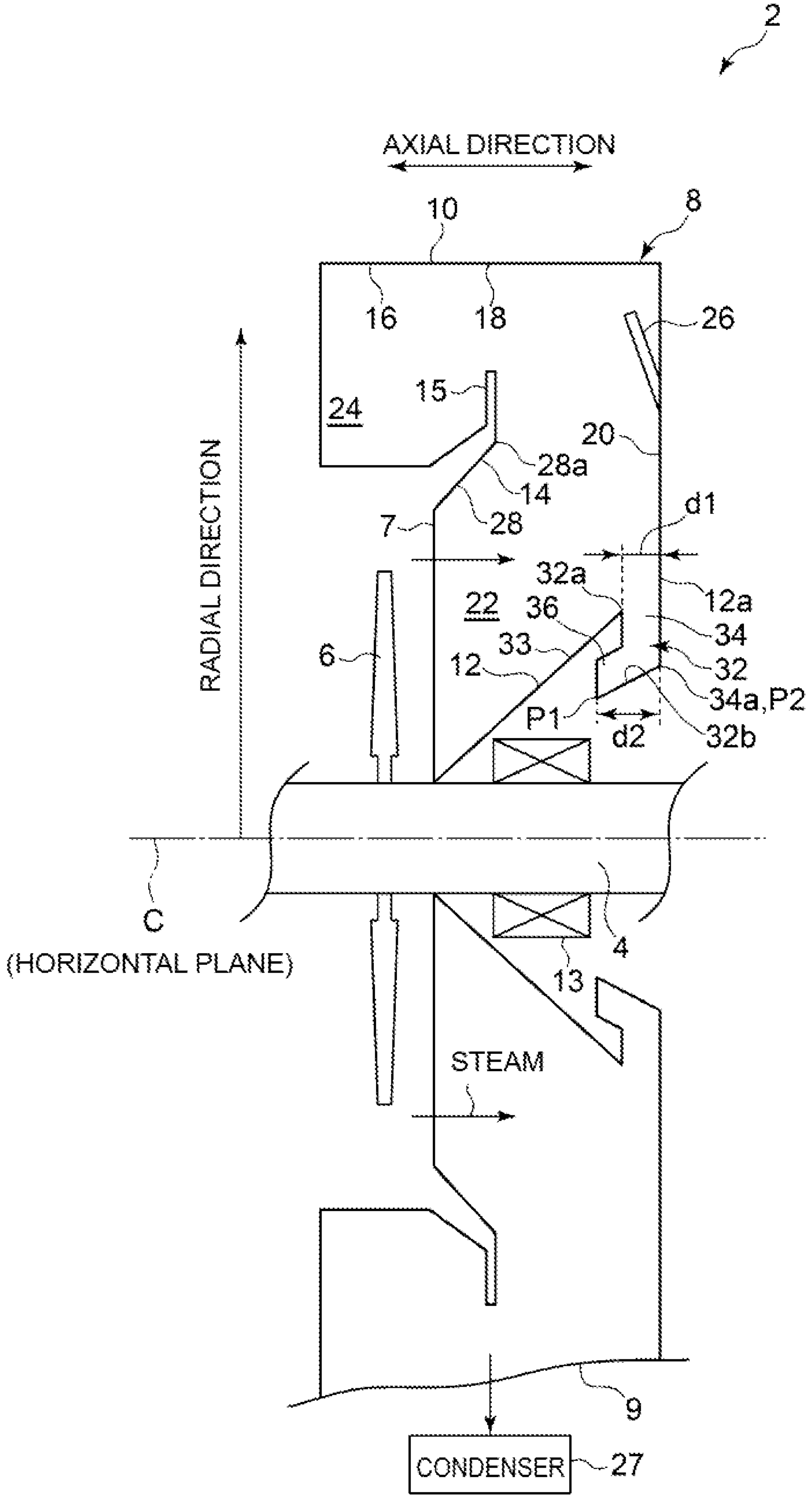
FIG. 11 is a schematic diagram schematically showing a cross section of a steam turbine 2 according to another embodiment, taken along the axial direction.

In some embodiments, as depicted in FIG. 11 for instance, the width d1, in the axial direction, of the opening end 32*a* of the cavity 32 may be smaller than the width d2, in the axial direction, of the bottom surface 32*b* of the cavity 32. The cavity 32 is formed over the entire range in the circumferential direction, so as to have an annular shape.

Furthermore, in the embodiment depicted in FIG. 11, the cavity 32 includes a radial-direction cavity portion 34 extending inward in the radial direction from the opening end 32*a* of the cavity 32, and an oblique cavity portion 36 connecting to the radially inner end 34*a* of the radial-direction cavity portion 34, in a cross-section taken along the axial direction. The oblique cavity portion 36 extends in an oblique direction that is oblique with respect to the axial direction so as to approach the inner side in the radial direction from the radially inner end 34*a* of the radial-direction cavity portion 34 toward the rotor blade 6. Furthermore, the position P1 of the bottom surface 32*b* of the cavity 32 that is closest to the rotor blade 6 is positioned at the inner side, in the radial direction, of the position P2 of the bottom surface 32*b* that is farthest from the rotor blade 6.

In the configuration depicted in FIG. 11, the width d1, in the axial direction, of the opening end 32*a* of the cavity 32 is smaller than the width d2, in the axial direction, of the bottom surface 32*b* of the cavity 32, and thus it is possible to suppress re-exit of steam via the cavity 32 after the steam flows into the cavity 32, and enhance the effect to suppress separation.

Furthermore, the position P1 of the bottom surface 32*b* of the cavity 32 that is closest to the rotor blade 6 is positioned at the inner side, in the radial direction, of the position P2 of the bottom surface 32*b* that is farthest from the rotor blade 6, and thus it is possible to suppress re-exit of steam toward the rotor blade 6 after the steam flows into the cavity 32, and enhance the effect to suppress separation.

Embodiments of the present invention were described in detail above, but the present invention is not limited thereto, and various amendments and modifications may be implemented.

Figure 12:
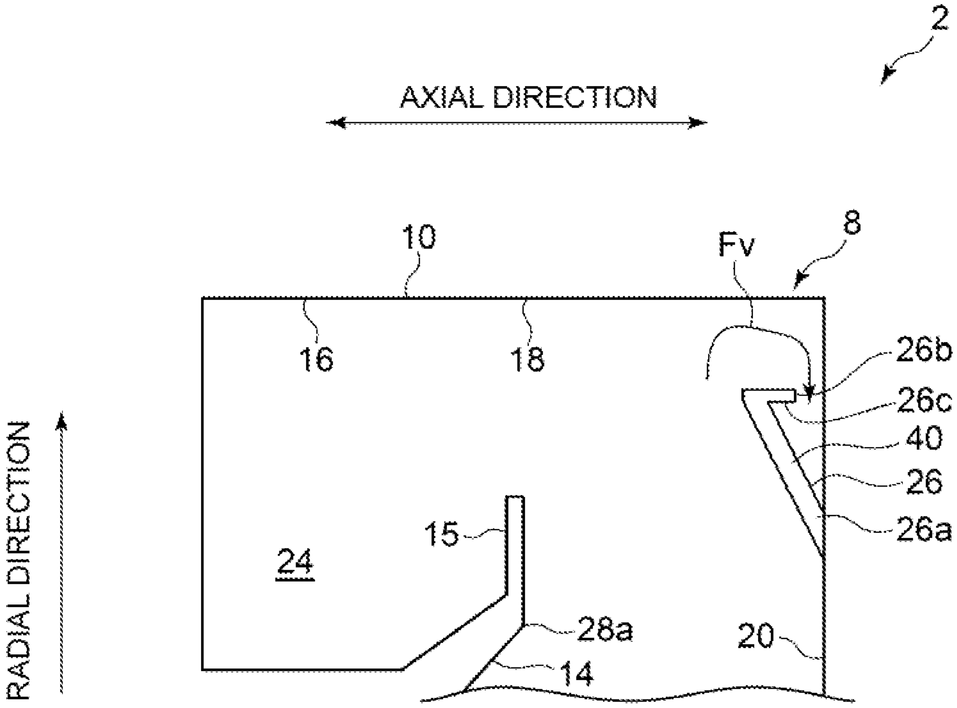
FIG. 12 is a diagram showing another example of the shape of the protruding portion 26.

In some embodiments, as illustrated in FIG. 12 for instance, the tip end portion 26*c* of the protruding portion 26 may be bended toward the side wall surface 20. In the configuration depicted in FIG. 12, the protruding portion 26 includes an oblique portion 40 extending outward in the radial direction with distance from the side wall surface 20 in the axial direction, and a tip end portion 26*c* extending from the tip end of the oblique portion 40 at the side of the side wall surface 20 along the axial direction.

With the above configuration, as depicted in FIG. 12, it is possible to suppress outflow of the vertical vortex to the mainstream side (the side of the diffuser flow passage 22) after the vertical vortex enters the gap between the protruding portion 26 and the side wall surface 20. The tip end portion 26*c* of the protruding portion 26 may be bended toward the side wall surface 20 as depicted in FIG. 12, or may be curved smoothly toward the side wall surface 20.

Figure 13:
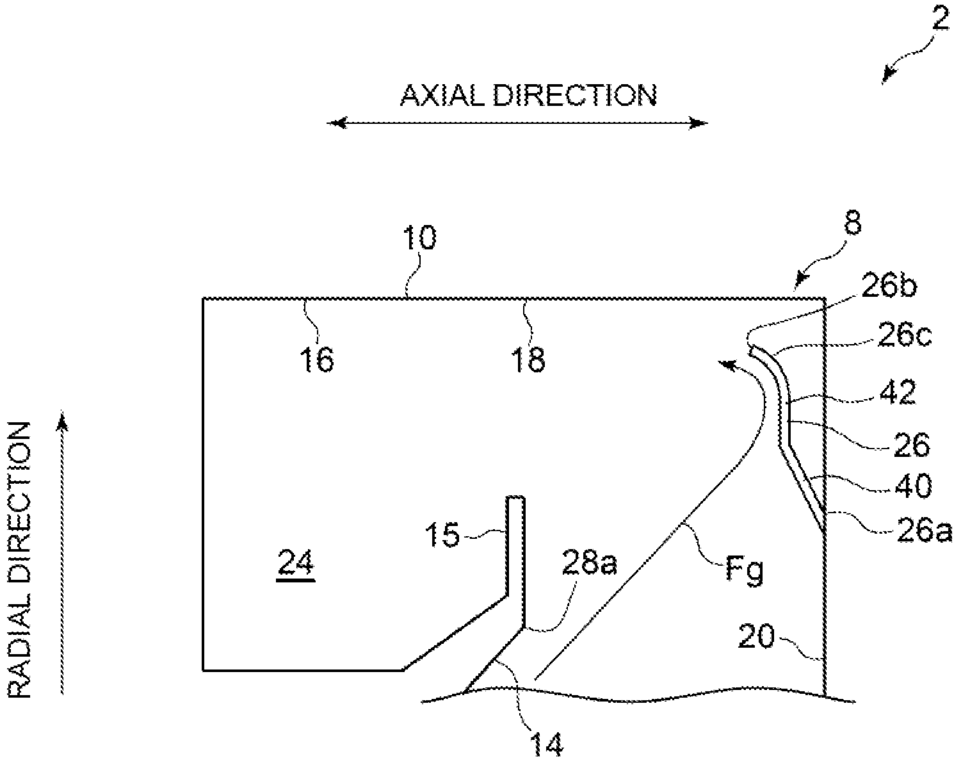
FIG. 13 is a diagram showing another example of the shape of the protruding portion 26.

In some embodiments, as illustrated in FIG. 13 for instance, the tip end portion 26*c* of the protruding portion 26 may be bended toward the flow guide 14. In the configuration depicted in FIG. 13, the protruding portion 26 includes an oblique portion 40 extending outward in the radial direction with distance from the side wall surface 20 in the axial direction, a radial-direction portion 42 extending from the tip end side of the oblique portion 40 along the radial direction toward the inner circumferential surface 18, and a tip end portion 26*c* extending in curve from the tip end side of the radial-direction portion 42 toward the flow guide 14 in the axial direction.

With the above configuration, since the tip end portion 26*c* of the protruding portion 26 is curved toward the flow guide 14 in the axial direction, the steam flow Fg flowing out from the diffuser flow passage 22 collides with the protruding portion 26 and is guided in a direction away from the side wall surface 20, and thus it is possible to suppress re-entry of the steam flow Fg to the diffuser flow passage 22. Thus, it is possible to suppress an increase in the pressure loss in the diffuser flow passage 22.

The contents described in the above respective embodiments can be understood as follows, for instance.

(1) A steam turbine exhaust chamber (e.g., the above described exhaust chamber 8) according to the present disclosure is a steam turbine exhaust chamber for guiding steam after passing through a rotor blade (e.g., the above described rotor blade 6) of a final stage of a steam turbine (e.g., the above described steam turbine 2) to outside of the steam turbine, and includes: a casing (e.g., the above described casing 10); a bearing cone (e.g., the above described bearing cone 12) disposed along a circumferential direction of a rotor (e.g., the above described rotor 4) of the steam turbine inside the casing; and a flow guide (e.g., the above described flow guide 14) disposed along the circumferential direction at a radially outer side of the bearing cone inside the casing, the flow guide forming a diffuser flow passage (e.g., the above described diffuser flow passage 22) between the flow guide and the bearing cone. An inner surface of the casing includes an inner circumferential surface (e.g., the above described inner circumferential surface 18) extending along an axial direction of the rotor at a radially outer side of the flow guide and a side wall surface (e.g., the above described side wall surface 20) connecting the inner circumferential surface and the bearing cone, a first protruding portion (e.g., the above described protruding portion 26) is formed on the side wall surface along the circumferential direction above a horizontal plane including a rotational axis of the rotor, the first protruding portion protruding outward in a radial direction of the rotor, and the first protruding portion is positioned at an outer side, in the radially direction, of a downstream end (e.g., the above described downstream end 28*a*) of an inner circumferential surface (e.g., the above described inner circumferential surface 28) of the flow guide in at least a partial range in the circumferential direction.

With the above steam turbine exhaust chamber described in the above (1), a vertical vortex falling down from the upper part (vicinity of the inner circumferential surface) of the steam turbine exhaust chamber is received by the first protruding portion, and thus it is possible to suppress intrusion of the vertical vortex into the diffuser flow passage between the flow guide and the bearing cone. Accordingly, it is possible to suppress deterioration of the performance of the exhaust chamber due to a decrease in the effective flow-passage area of the diffuser flow passage.

Furthermore, in at least partial range of the circumferential direction, the first protruding portion is disposed at the outer side, in the radial direction, of the downstream end of the inner circumferential surface of the flow guide, and thus it is possible to suppress interference of the first protruding portion itself with the steam flow of the diffuser flow passage, and it is possible to suppress an increase in the pressure loss inside the diffuser flow passage.

(2) In some embodiments, in the steam turbine exhaust chamber according to the above (1), a tip end portion (e.g., the above described tip end portion 26*c*) of the first protruding portion is bended toward the side wall surface in the axial direction.

With the above steam turbine exhaust chamber described in the above (2), it is possible to suppress outflow of the vertical vortex to the mainstream side after entering the gap between the first protruding portion and the side wall surface.

(3) In some embodiments, in the steam turbine exhaust chamber according to the above (1), a tip end portion (e.g., the above described tip end portion 26*c*) of the first protruding portion is bended toward the flow guide in the axial direction.

With the above steam turbine exhaust chamber described in the above (3), since the tip end portion of the first protruding portion is curved toward the flow guide in the axial direction, the steam flow flowing out from the diffuser flow passage collides with the protruding portion and is guided in a direction away from the side wall surface, and thus it is possible to suppress re-entry of the steam flow to the diffuser flow passage. Thus, it is possible to suppress an increase in the pressure loss in the diffuser flow passage.

(4) In some embodiments, in the steam turbine exhaust chamber according to any one of the above (1) to (3), a length (e.g., the above described length L) from a root end (e.g., the above described root end 26*a*) to a tip end (e.g., the above described tip end 26*b*) of the first protruding portion varies depending on a position in the circumferential direction.

With the steam turbine exhaust chamber described in the above (4), the length of the first protruding portion is set appropriately in accordance with the position in the circumferential direction, and thereby it is possible to suppress non-uniformity of the flow passage between the inner circumferential surface and the tip end of the first protruding portion in the circumferential direction, and attract the above described vertical vortex toward the gap between the first protruding portion and the side wall surface effectively. Thus, it is possible to suppress deterioration of the performance of the exhaust chamber due to a decrease in the effective flow-passage area of the diffuser flow passage effectively.

(5) In some embodiments, in the steam turbine exhaust chamber according to the above (4), the length of the first protruding portion decreases with distance toward an upper side along the circumferential direction in at least a partial range in the circumferential direction.

With the steam turbine exhaust chamber described in the above (5), it is possible to suppress non-uniformity of the flow passage between the inner circumferential surface and the tip end in the circumferential direction, and attract the above described vertical vortex toward the gap between the first protruding portion and the side wall surface effectively. Thus, it is possible to suppress deterioration of the performance of the exhaust chamber due to a decrease in the effective flow-passage area of the diffuser flow passage effectively.

(6) In some embodiments, in the steam turbine exhaust chamber according to any one of the above (1) to (5), a distance (e.g., the above described distance ‘r’) between a root end of the first protruding portion and the rotational axis varies depending on a position in the circumferential direction.

With the steam turbine exhaust chamber described in the above (6), by setting the distance between the root end of the first protruding portion and the rotational axis appropriately in accordance with the position in the circumferential direction, it is possible to suppress non-uniformity of the flow passage between the inner circumferential surface and the tip end of the first protruding portion in the circumferential direction, and attract the above described vertical vortex toward the gap between the protruding portion and the side wall surface effectively. Thus, it is possible to suppress deterioration of the performance of the exhaust chamber due to a decrease in the effective flow-passage area of the diffuser flow passage effectively.

(7) In some embodiments, in the steam turbine exhaust chamber according to the above (6), the distance between the root end of the first protruding portion and the rotational axis decreases with distance toward an upper side along the circumferential direction, in at least a partial range in the circumferential direction.

With the steam turbine exhaust chamber described in the above (7), it is possible to suppress non-uniformity of the flow passage width between the inner circumferential surface and the tip end of the first protruding portion in the circumferential direction, and attract the above described vertical vortex toward the gap between the protruding portion and the side wall surface effectively. Accordingly, it is possible to suppress deterioration of the performance of the exhaust chamber due to a decrease in the effective flow-passage area of the diffuser flow passage effectively.

(8) In some embodiments, in the steam turbine exhaust chamber according to any one of the above (1) to (7), when, regarding a position in the circumferential direction, one of directions indicated by a horizontal line orthogonal to the rotational axis is defined as zero degrees and a position vertically above the rotational axis is defined as 90 degrees, the first protruding portion is disposed only in a partial range between zero and 180 degrees in the circumferential direction.

With the steam turbine exhaust chamber described in the above (8), by providing the first protruding portion in a partial range where the vertical vortex is dominant, of the range between zero and 180 degrees, it is possible to suppress intrusion of the vertical vortex into the diffuser flow passage and improve the performance of the exhaust chamber, while suppressing an increase in the pressure loss applied by the first protruding portion, compared to a case where the protruding portion is provided over the entire range between zero and 180 degrees.

(9) In some embodiments, in the steam turbine exhaust chamber according to the above (8), at least a part of the first protruding portion is disposed inside a range between 30 and 150 degrees in the circumferential direction.

With the steam turbine exhaust chamber described in the above (9), it is possible to suppress intrusion of the vertical vortex into the diffuser flow passage and improve the performance of the exhaust chamber.

(10) In some embodiments, in the steam turbine exhaust chamber according to any one of the above (1) to (9), the side wall surface has a plurality of protruding portions (e.g., the above described protruding portions 26A to 26D or the above described protruding portions 26E and 26F) protruding outward in the radial direction at a position at an outer side of a downstream end of an inner circumferential surface of the flow guide in a radial direction of the rotor, above a horizontal plane including the rotational axis of the rotor, the plurality of protruding portions are arranged at intervals in the circumferential direction, and the plurality of protruding portions include the first protruding portion.

With the steam turbine exhaust chamber described in the above (10), the plurality of protruding portions are disposed at intervals in the circumferential direction, and thus it is possible to easily fix each protruding portion to the side wall surface by welding or the like, compared to a case where the respective protruding portions are formed continuously in the circumferential direction. Furthermore, by providing each protruding portion at a position where the vertical vortex is dominant, it is possible to suppress intrusion of the vertical vortex into the diffuser flow passage and improve the performance of the exhaust chamber, while suppressing an increase in the pressure loss applied by each protruding portion.

(11) In some embodiments, in the steam turbine exhaust chamber according to the above (10), the plurality of protruding portions include a second protruding portion (e.g., the above described protruding portion 26B or 26C) disposed at a position higher than the first protruding portion (e.g., the above described protruding portion 26A or 26D), and a length (e.g., the above described length L) from a root end to a tip end of the second protruding portion is longer than a length (e.g., the above described length L) from a root end to a tip end of the first protruding portion.

With the steam turbine exhaust chamber described in the above (11), the length of the protruding portions positioned at a relatively high position is greater than the length of the protruding portions positioned at a relatively low position, and thereby it is possible to suppress intrusion of the vertical vortex into the diffuser flow passage effectively and improve the performance of the exhaust chamber.

(12) In some embodiments, in the steam turbine exhaust chamber according to the above (10), a recess portion (e.g., the above described recess portion 30) is formed on an upper end of the first protruding portion.

With the steam turbine exhaust chamber described in the above (12), at the upper end of the first protruding portion, the flow passage width between the inner circumferential surface and the tip end of the protruding portion tends to become narrow. Thus, by providing the recess portion as described above, it is possible to ensure the flow passage width and induce the vertical vortex to the gap between the first protruding portion and the side wall surface. Accordingly, it is possible to suppress intrusion of the vertical vortex into the diffuser flow passage and improve the exhaust chamber performance.

(13) In some embodiments, in the steam turbine exhaust chamber according to the above (12), the plurality of protruding portions include a second protruding portion (e.g., the above described protruding portion 26F) disposed opposite to the first protruding portion (e.g., the above described protruding portion 26E) across a vertical plane including the rotational axis, and a recess portion (e.g., the above described recess portion 30) is formed on an upper end of the second protruding portion.

With the steam turbine exhaust chamber described in the above (13), at the upper end of each of the first protruding portion and the second protruding portion, the flow passage width between the inner circumferential surface and the tip end of each protruding portion tends to become narrow. Thus, by providing the recess portion as described above, it is possible to ensure the flow passage width and induce the vertical vortex to the gap between the protruding portion and the side wall surface. Accordingly, it is possible to suppress intrusion of the vertical vortex into the diffuser flow passage and improve the exhaust chamber performance. Furthermore, since the first protruding portion and the second protruding portion are disposed opposite to one another across the vertical plane including the rotational axis, it is possible to fix each protruding portion to the side wall surface easily by welding.

(14) In some embodiments, in the steam turbine exhaust chamber according to any one of the above (1) to (13), a cavity (e.g., the above described cavity 32) is formed on an outer circumferential surface (e.g., the above described outer circumferential surface 33) of the bearing cone.

With the steam turbine exhaust chamber described in the above (14), a part of the steam flow colliding with the side wall surface is guided to the cavity, and thus it is possible to suppress a reverse flow of the steam flow along the bearing cone and suppress flux which may cause two-dimensional separation at the time of low-mach operation, and thereby improve the low-mach side performance. Furthermore, it is also possible to suppress three-dimensional separation at the time of high-mach operation due to provision of the protruding portion, and thus it is possible to realize a high robustness regarding the performance against the operating conditions.

(15) In some embodiments, in the steam turbine exhaust chamber according to the above (14), a width (e.g., the above descried width d1) of an opening end (e.g., the above described opening end 32*a*) of the cavity in the axial direction is smaller than a width (the above described width d2) of a bottom surface (e.g., the above described bottom surface 32*b*) of the cavity in the axial direction.

With the above steam turbine exhaust chamber described in the above (15), the width, in the axial direction, of the opening end of the cavity is smaller than the width, in the axial direction, of the bottom surface of the cavity, and thus it is possible to suppress re-exit of steam via the cavity after the steam flows into the cavity, and enhance the effect to suppress separation.

(16) In some embodiments, in the steam turbine exhaust chamber according to the above (14) or (15), a position (e.g., the above described position P1) closest to the rotor blade at a bottom surface of the cavity is positioned at an inner side, in the radial direction, of a position (e.g., the above described position P2) farthest from the rotor blade at the bottom surface.

With the steam turbine exhaust chamber described in the above (16), the position of the bottom surface of the cavity that is closest to the rotor blade is positioned at the inner side, in the radial direction, of the position of the bottom surface that is farthest from the rotor blade, and thus it is possible to suppress re-exit of steam toward the rotor blade after the steam flows into the cavity, and enhance the effect to suppress separation.

(17) A steam turbine according to at least one embodiment of the present disclosure includes: the steam turbine exhaust chamber according to any one of the above (1) to (16); and the rotor.

With the steam turbine in the above (17), the steam turbine includes the steam turbine exhaust chamber described in any one of the above (1) to (16), and thus it is possible to suppress an increase in the pressure loss due to a decrease in the effective flow-passage area of the diffuser flow passage, and suppress deterioration of the exhaust chamber performance.

REFERENCE SIGNS LIST

2 Steam turbine
4 Rotor
6 Rotor blade
7 Exhaust chamber inlet
8 Exhaust chamber (steam turbine exhaust chamber)
9 Exhaust chamber outlet
10 Casing
12 Bearing cone
12*a* Downstream end
13 Bearing
14 Flow guide
15 Flow directing plate
16 Inner surface
18 Inner circumferential surface 20 Side wall surface
22 Diffuser flow passage
24 Radially outer space
25 26 (26A,26B,26C,26D,26E,26F) Protruding portion (first protruding portion, second protruding portion)
26*a* Root end
26*b* Tip end
26*u* Upper end
27 Condenser
28 Inner circumferential surface
28*a* Downstream end
30 Recess portion
32 Cavity
32*a* Opening end
32*b* Bottom surface
33 Outer circumferential surface
34 Radial-direction cavity portion
34*a* Radially inner end
36 Oblique cavity portion
40 Oblique portion
42 Radial-direction portion

The invention claimed is:

1. A steam turbine exhaust chamber for guiding steam after passing through a rotor blade of a final stage of a steam turbine to outside of the steam turbine, the steam turbine exhaust chamber comprising:
- a casing;
- a bearing cone disposed along a circumferential direction of a rotor of the steam turbine inside the casing; and
- a flow guide disposed along the circumferential direction at a radially outer side of the bearing cone inside the casing, the flow guide forming a diffuser flow passage between the flow guide and the bearing cone,
- wherein an inner surface of the casing includes an inner circumferential surface extending along an axial direction of the rotor at a radially outer side of the flow guide and a side wall surface connecting the inner circumferential surface and the bearing cone,
- wherein a first protruding portion is formed on the side wall surface along the circumferential direction above a horizontal plane including a rotational axis of the rotor, the first protruding portion protruding outward in a radial direction of the rotor,
- wherein the first protruding portion is positioned at an outer side, in the radial direction, of a downstream end of an inner circumferential surface of the flow guide in at least a partial range in the circumferential direction,
- wherein a root end of the first protruding portion is positioned inward in a radial direction of the rotor than a tip end of the first protruding portion, the root end of the first protruding portion being fixed to the side wall surface,
- wherein the tip end of the first protruding portion is with distance from the side wall surface and the inner circumferential surface; and
- wherein a tip end portion of the first protruding portion is bended toward the side wall surface in the axial direction.

2. The steam turbine exhaust chamber according to claim 1,
- wherein, when, regarding a position in the circumferential direction, one of directions indicated by a horizontal line orthogonal to the rotational axis is defined as zero degrees and a position vertically above the rotational axis is defined as 90 degrees,
- the first protruding portion is disposed only in a partial range between zero and 180 degrees in the circumferential direction.

3. The steam turbine exhaust chamber according to claim 2,
- wherein at least a part of the first protruding portion is disposed inside a range between 30 and 150 degrees in the circumferential direction.

4. The steam turbine exhaust chamber according to claim 1,
- wherein a cavity is formed on an outer circumferential surface of the bearing cone.

5. The steam turbine exhaust chamber according to claim 4,
- wherein a width of an opening end of the cavity in the axial direction is smaller than a width of a bottom surface of the cavity in the axial direction.

6. The steam turbine exhaust chamber according to claim 4,
- wherein a position closest to the rotor blade at a bottom surface of the cavity is positioned at an inner side, in the radial direction, of a position farthest from the rotor blade at the bottom surface.

7. The steam turbine, comprising:
- the steam turbine exhaust chamber according to claim 1; and
- the rotor.

8. A steam turbine exhaust chamber for guiding steam after passing through a rotor blade of a final stage of a steam turbine to outside of the steam turbine, the steam turbine exhaust chamber comprising:
- a casing;
- a bearing cone disposed along a circumferential direction of a rotor of the steam turbine inside the casing; and
- a flow guide disposed along the circumferential direction at a radially outer side of the bearing cone inside the casing, the flow guide forming a diffuser flow passage between the flow guide and the bearing cone,
- wherein an inner surface of the casing includes an inner circumferential surface extending along an axial direction of the rotor at a radially outer side of the flow guide and a side wall surface connecting the inner circumferential surface and the bearing cone,
- wherein a first protruding portion is formed on the side wall surface along the circumferential direction above a horizontal plane including a rotational axis of the rotor, the first protruding portion protruding outward in a radial direction of the rotor,
- wherein the first protruding portion is positioned at an outer side, in the radial direction, of a downstream end of an inner circumferential surface of the flow guide in at least a partial range in the circumferential direction,
- wherein a root end of the first protruding portion is positioned inward in a radial direction of the rotor than a tip end of the first protruding portion, the root end of the first protruding portion being fixed to the side wall surface,
- wherein the tip end of the first protruding portion is with distance from the side wall surface and the inner circumferential surface, and
- wherein a tip end portion of the first protruding portion is bended toward the flow guide in the axial direction.

9. A steam turbine exhaust chamber for guiding steam after passing through a rotor blade of a final stage of a steam turbine to outside of the steam turbine, the steam turbine exhaust chamber comprising:
- a casing;

a bearing cone disposed along a circumferential direction of a rotor of the steam turbine inside the casing; and a flow guide disposed along the circumferential direction at a radially outer side of the bearing cone inside the casing, the flow guide forming a diffuser flow passage between the flow guide and the bearing cone, wherein an inner surface of the casing includes an inner circumferential surface extending along an axial direction of the rotor at a radially outer side of the flow guide and a side wall surface connecting the inner circumferential surface and the bearing cone, wherein a first protruding portion is formed on the side wall surface along the circumferential direction above a horizontal plane including a rotational axis of the rotor, the first protruding portion protruding outward in a radial direction of the rotor, wherein the first protruding portion is positioned at an outer side, in the radial direction, of a downstream end of an inner circumferential surface of the flow guide in at least a partial range in the circumferential direction, wherein a root end of the first protruding portion is positioned inward in a radial direction of the rotor than a tip end of the first protruding portion, the root end of the first protruding portion being fixed to the side wall surface, wherein the tip end of the first protruding portion is with distance from the side wall surface and the inner circumferential surface, and wherein a length from the root end to the tip end of the first protruding portion varies depending on a position in the circumferential direction.

10. The steam turbine exhaust chamber according to claim 9, wherein the length of the first protruding portion decreases with distance toward an upper side along the circumferential direction in at least a partial range in the circumferential direction.

11. A steam turbine exhaust chamber for guiding steam after passing through a rotor blade of a final stage of a steam turbine to outside of the steam turbine, the steam turbine exhaust chamber comprising:

a casing;

a bearing cone disposed along a circumferential direction of a rotor of the steam turbine inside the casing; and a flow guide disposed along the circumferential direction at a radially outer side of the bearing cone inside the casing, the flow guide forming a diffuser flow passage between the flow guide and the bearing cone, wherein an inner surface of the casing includes an inner circumferential surface extending along an axial direction of the rotor at a radially outer side of the flow guide and a side wall surface connecting the inner circumferential surface and the bearing cone, wherein a first protruding portion is formed on the side wall surface along the circumferential direction above a horizontal plane including a rotational axis of the rotor, the first protruding portion protruding outward in a radial direction of the rotor, wherein the first protruding portion is positioned at an outer side, in the radial direction, of a downstream end of an inner circumferential surface of the flow guide in at least a partial range in the circumferential direction, wherein a root end of the first protruding portion is positioned inward in a radial direction of the rotor than a tip end of the first protruding portion, the root end of the first protruding portion being fixed to the side wall surface, wherein the tip end of the first protruding portion is with distance from the side wall surface and the inner circumferential surface, and wherein a distance between a root end of the first protruding portion and the rotational axis varies depending on a position in the circumferential direction.

12. The steam turbine exhaust chamber according to claim 11, wherein the distance between the root end of the first protruding portion and the rotational axis decreases with distance toward an upper side along the circumferential direction, in at least a partial range in the circumferential direction.

13. A steam turbine exhaust chamber for guiding steam after passing through a rotor blade of a final stage of a steam turbine to outside of the steam turbine, the steam turbine exhaust chamber comprising:

a casing;

a bearing cone disposed along a circumferential direction of a rotor of the steam turbine inside the casing; and a flow guide disposed along the circumferential direction at a radially outer side of the bearing cone inside the casing, the flow guide forming a diffuser flow passage between the flow guide and the bearing cone, wherein an inner surface of the casing includes an inner circumferential surface extending along an axial direction of the rotor at a radially outer side of the flow guide and a side wall surface connecting the inner circumferential surface and the bearing cone, wherein a first protruding portion is formed on the side wall surface along the circumferential direction above a horizontal plane including a rotational axis of the rotor, the first protruding portion protruding outward in a radial direction of the rotor, wherein the first protruding portion is positioned at an outer side, in the radial direction, of a downstream end of an inner circumferential surface of the flow guide in at least a partial range in the circumferential direction, wherein a root end of the first protruding portion is positioned inward in a radial direction of the rotor than a tip end of the first protruding portion, the root end of the first protruding portion being fixed to the side wall surface, wherein the tip end of the first protruding portion is with distance from the side wall surface and the inner circumferential surface, and wherein the side wall surface has a plurality of protruding portions protruding outward in the radial direction at a position at an outer side of a downstream end of an inner circumferential surface of the flow guide in the radial direction of the rotor, above a horizontal plane including the rotational axis of the rotor, wherein the plurality of protruding portions are arranged at intervals in the circumferential direction, wherein the plurality of protruding portions include the first protruding portion;

wherein the plurality of protruding portions include a second protruding portion disposed at a position higher than the first protruding portion, and wherein a length from a root end to a tip end of the second protruding portion is longer than a length from a root end to a tip end of the first protruding portion.

14. A steam turbine exhaust chamber for guiding steam after passing through a rotor blade of a final stage of a steam turbine to outside of the steam turbine, the steam turbine exhaust chamber comprising:

a casing;

a bearing cone disposed along a circumferential direction of a rotor of the steam turbine inside the casing; and a flow guide disposed along the circumferential direction at a radially outer side of the bearing cone inside the casing, the flow guide forming a diffuser flow passage between the flow guide and the bearing cone, wherein an inner surface of the casing includes an inner circumferential surface extending along an axial direction of the rotor at a radially outer side of the flow guide and a side wall surface connecting the inner circumferential surface and the bearing cone, wherein a first protruding portion is formed on the side wall surface along the circumferential direction above a horizontal plane including a rotational axis of the rotor, the first protruding portion protruding outward in a radial direction of the rotor, wherein the first protruding portion is positioned at an outer side, in the radial direction, of a downstream end of an inner circumferential surface of the flow guide in at least a partial range in the circumferential direction, wherein a root end of the first protruding portion is positioned inward in a radial direction of the rotor than a tip end of the first protruding portion, the root end of the first protruding portion being fixed to the side wall surface, wherein the tip end of the first protruding portion is with distance from the side wall surface and the inner circumferential surface, and wherein a recess portion is formed on an upper end of the first protruding portion.

15. The steam turbine exhaust chamber according to claim 14, wherein the plurality of protruding portions include a second protruding portion disposed opposite to the first protruding portion across a vertical plane including the rotational axis, and wherein a recess portion is formed on an upper end of the second protruding portion.

* * * * *